(12) United States Patent
Roche et al.

(10) Patent No.: US 10,412,190 B1
(45) Date of Patent: Sep. 10, 2019

(54) DEVICE MULTI-STEP STATE TRANSITIONS

(71) Applicant: Amazon Technologies, Inc., Seattle, WA (US)

(72) Inventors: Kyle Michael Roche, Mercer Island, WA (US); David Craig Yanacek, Seattle, WA (US); Jonathan I. Turow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 15/263,239

(22) Filed: Sep. 12, 2016

(51) Int. Cl.
*H04L 29/08* (2006.01)
*H04L 29/06* (2006.01)
*H04L 12/24* (2006.01)

(52) U.S. Cl.
CPC .......... *H04L 67/32* (2013.01); *H04L 41/0803* (2013.01); *H04L 67/26* (2013.01); *H04L 67/42* (2013.01)

(58) Field of Classification Search
CPC ......... H04L 67/32; H04L 67/42; H04L 67/26; H04L 41/0803
See application file for complete search history.

(56) References Cited

U.S. PATENT DOCUMENTS

| | | | | |
|---|---|---|---|---|
| 8,689,214 B2* | 4/2014 | Marshall | ............ | G06F 9/45558 |
| | | | | 714/45 |
| 8,694,639 B1* | 4/2014 | Vermeulen | ............ | G06F 9/5011 |
| | | | | 709/226 |
| 2014/0241354 A1* | 8/2014 | Shuman | .................. | H04L 67/16 |
| | | | | 370/390 |
| 2014/0354160 A1* | 12/2014 | Aggarwal | .......... | H05B 37/0227 |
| | | | | 315/152 |
| 2015/0172390 A1* | 6/2015 | Colrain | ................. | H04L 67/146 |
| | | | | 709/203 |
| 2015/0319046 A1* | 11/2015 | Plummer | ............ | H04L 12/2807 |
| | | | | 715/736 |
| 2016/0050265 A1* | 2/2016 | Botticelli | ................ | H04W 4/80 |
| | | | | 709/219 |
| 2016/0087922 A1* | 3/2016 | Kesavan | ................ | H04L 51/30 |
| | | | | 709/206 |
| 2017/0374161 A1* | 12/2017 | Chrysanthakopoulos | | .................... |
| | | | | H04L 67/42 |
| 2019/0014132 A1* | 1/2019 | Chen | ................... | H04L 63/1441 |

* cited by examiner

*Primary Examiner* — Arvin Eskandarnia
*Assistant Examiner* — Chhian (Amy) Ling
(74) *Attorney, Agent, or Firm* — Thorpe North & Western, LLP.

(57) ABSTRACT

A technology is described for operating a device shadowing service that manages multi-step device state transitions. An example method may include executing a state change listing that includes a set of state transition commands that change a state of a device to a desired state, wherein a first state transition command included in the state change listing that instructs the device to assume a first state may be executed. Thereafter, an indication that the device has assumed the first state may be received. In response, a second state transition command included in the state change listing that sends instructions to the device to assume a second state may be executed. Thereafter, an indication that the device has assumed the second state may be received. A recorded state of a device representation that represents the state of the device may be updated to indicate the second state.

20 Claims, 8 Drawing Sheets

DEVICE MULTI-STEP STATE TRANSITIONS

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances, light bulbs, and light switches offer the possibility of being configured with communication capabilities for the purpose of transmitting status and receiving external control communications.

DETAILED DESCRIPTION

Figure 1:
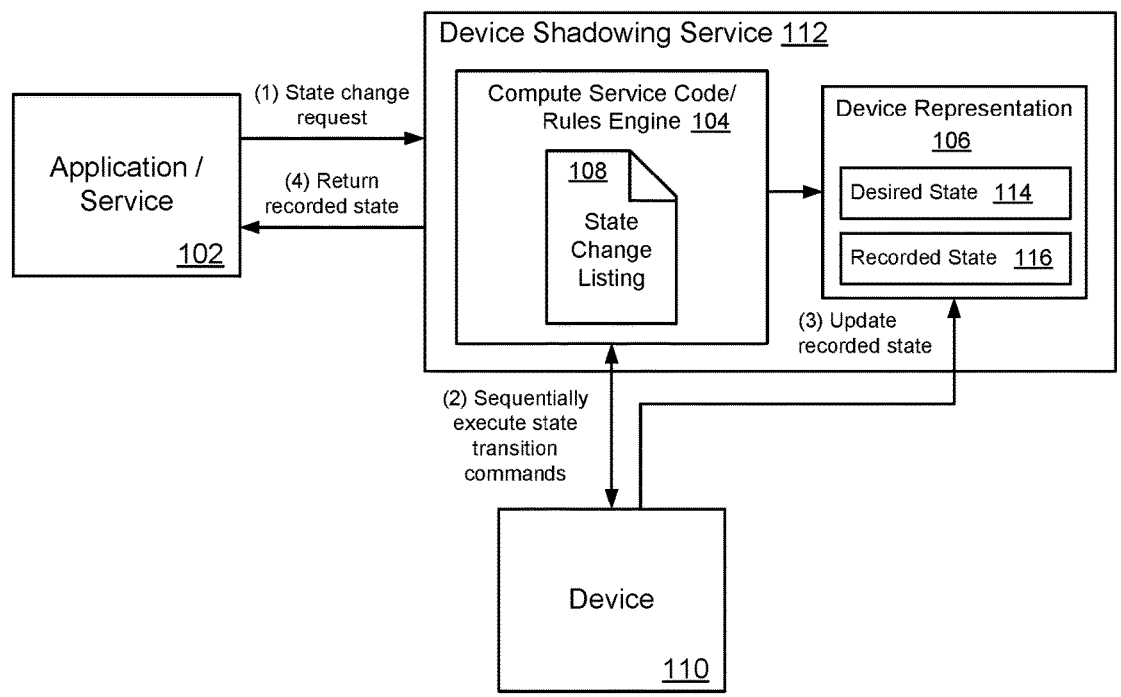
FIG. 1 is a block diagram illustrating an example system and method for a device shadowing service configured to manage multi-step device state transitions for devices represented by device representations.

A technology is described for a device shadowing service configured to manage multi-step state transitions for devices that may be network addressable and/or eventually addressable (e.g., capable of receiving relayed messages) by the device shadowing service. A device may be one of many devices that create a large network of addressable devices. This "network" is commonly referred to as the Internet of Things (IoT). A state of a device may be electronically represented using a device representation managed by the device shadowing service in a service provider environment.

A device representation may represent one or more states of a device. In one example, a state represented by device representation may include a recorded state and a desired state. The recorded state may be the last know state of a device, and a desired state may be a state to which the device may be instructed to assume by a device shadowing service. In assuming a desired state, a device may transition through one or more states. As an illustration, a network addressable door may transition between a closed state and an open state by assuming multiple transition states that may include disengaging a lock, retracting a latch, and activating an actuator that opens the door.

The device shadowing service may be configured to manage multi-step state transitions for devices using state change listings. A state change listing may include a set of state transition commands. Executing the set of state transition commands may instruct a device to transition from a current state to a desired state, or perform a function by transitioning between a number of states. As an illustration, a state change listing may include a set of transition commands that when executed as a set, instruct a network addressable door to open. For example, a first state transition command may instruct the network addressable door to disengage a lock, a second state transition command may instruct the door to retract a latch, and a third state transition command may instruct the door to engage an actuator that opens the door. A state change listing may be executed using a rules engine or an instance of a compute service code. A compute service code may execute on a managed compute service code platform for back-end web services and may include a segment of defined program code that may be like a function that can receive parameters, perform processing, and provide return values.

In one example, the device shadowing service may receive state change requests from clients that may include applications and services executing on the clients. A state change request may include a state change listing (e.g., a listing of program codes, lines of code, lines of scripting, or operations to perform state changes), or a state change request may include an identifier for a state change listing that can be retrieved by the device shadowing service. In one example, the device shadowing service may be configured to launch a compute service code instance and submit a state change listing to the compute service code instance for execution of state transition commands included in the state change listing. In another example, a state change listing may be submitted to a rules engine for execution of the state transition commands included in the state change listing.

The state transition commands included in a state change listing may be processed individually, such that an indication that a device has assumed a state specified by a first state transition command may be received before executing a second state transition command. In the event that the state transition commands are successfully executed and the device has assumed a desired state, the recorded state of a device representation that represents the device may be updated to indicate the desired state and the recorded state may be returned to a client that requested the state change request. In the event that a state transition command fails, unexecuted state transition command(s) may be posted to the device representation as desired state(s) and the device representation may be marked as out of synch with the device, such that the next time a synchronizing process runs, the device may be instructed to assume the desired state(s).

FIG. 1 is a block diagram illustrating a high level example of a system and method for a device shadowing service 112 configured to manage multi-step state transitions for devices 110 represented by device representations 106. The device shadowing service 112 may manage the device representations 106 in combination with managing state change requests received from applications and/or services 102 configured to send the state change requests to the device shadowing service 112.

A device representation 106 may be an electronic representation (e.g., a data object) of a device 110 that can be referenced via a computer network (e.g., the internet and a virtual network of a service provider environment) and updated, even at times that the device 110 itself may be unreachable. For example, to conserve power, some battery-powered and other devices may disable wireless radios when not actively transmitting data to the device shadowing service 112 or polling the device shadowing service 112 for updates. For these and other reasons, a device 110 may connect to a network only intermittently, while an application or service 102 may attempt to interact with the device 110 at times that the device 110 may not be connected to the network or may not otherwise be available.

In order to overcome limitations associated with intermittent connectivity, network bandwidth, and computing capacity, the device shadowing service 112 may maintain a cached device representation 106 for a device 110 that allows an application and/or service 102 to access information, such as state information, for the device 110 at any time. A device 110 may report state changes and other information for the device 110 to the device shadowing service 112, and the reported information may be stored within the device representation 106. The device representation 106 may include a recorded state 116 and a desired state 114. The recorded state 116 may be the last known state of the device 110 represented by the device representation 106, and the desired state 114 may be a state to which the device 110 may be instructed to assume.

In addition to accessing information for a device 110 via the device shadowing service 112 and a device representation 106, applications and services 102 may request that the device 110 assume a desired state 114 and that the device representation 106 be updated to reflect the state of the device 110. For example, an application and/or service 102 may send a state change request to the device shadowing service 112 requesting that the device 110 assume the desired state 114. In assuming the desired state 114, the device 110 may transition through a number of states in order to arrive at the desired state 114. As such, a state change listing that includes a set of sequential state transition commands may be used to instruct the device 110 to assume sequential states until the desired state 114 is assumed, or until a failure occurs. For example, the state change listing 108 may include a first state change command that instructs the device 110 to assume a first state, and a second state change command that instructs the device 110 to assume a second state, as well as additional state change commands included in the state change listing 108. As a result, the multi-step state transition associated with the device 110 may be performed without having to update a recorded state 116 represented by the device representation 106 after executing each step in the state change listing 108. As will be appreciated, a state change listing 108 may include any number of state change commands.

An application and/or service 102 may send a state change request to the device shadowing service 112 requesting that a device 110 assume a desired state 114, or perform a function by way of assuming a number of states. A state change request sent by an application or service 102 may include a state change listing 108 provided by the application or service 102, or the state change request may include an identifier for a state change listing 108 that may be used by the device shadowing service 112 to retrieve the state change listing 108 from a state change listing repository (See 220 in FIG. 2).

In response to receiving a state change request, the device shadowing service 112 may submit a state change listing 108 to an instance of a compute service code or rules engine 104. An instance of a compute service code may include a segment of program code that may be like a function, and the program code may receive parameters, perform processing, and provide return values. In one aspect, the compute service code may execute on a managed compute service code platform for back-end web services that runs a defined compute service code on a computing instance hosted in a service provider environment as described in relation to FIG. 4. That is, the compute service code may execute in a compute service that runs code in response to requests to execute the compute service code, and automatically manages the compute resources used by that compute service code. Once a compute service code has been executed and results have been returned, the compute service code and results may be removed from the memory of a computing instance or software container used to execute the compute service code. The compute service code provides for building smaller, on-demand applications that may be responsive to events and new information. In executing a state change listing 108, the compute service code 104 may execute the state transitions commands included in the state change listing 108.

The rules engine may be configured to evaluate state transition commands included in a state change listing 108 and transform the state transition commands to a format recognized by a device 110 and deliver the transformed state transition commands to the device 110. As a specific example, state transition commands may be written using a SQL (Structured Query Language) syntax variant. The rules engine may convert the state transition commands from the SQL syntax variant to a device recognizable format that may be provided to a device 110. Responses to commands received from the device 110 may be converted using the rules engine to a format recognized by device shadowing service 212.

Prior to submitting a state change listing 108 for execution of the state transition commands included in the state change listing 108, a determination may be made that a device 110 may be available to receive an update to the state of the device 110. For example, transactions may be monitored within the device shadowing service 112 by a transaction monitoring service or control plane (not shown) and before submitting a state change listing 108 for execution to update the state of a device 110, the monitoring service or control plane may be queried to ensure that in-progress transactions associated with the device 110 that would cause a collision in updating the state of the device 110 are not executing. Also, prior to submitting a state change listing 108 for a device 110, a determination may be made that an initial state or recorded state 116 of the device 110 may be different from a state 114 specified by the state change listing 108. In other words, if the current state of a device is the same as a specified state of a state change listing 108, there may be no need to execute the state change listing 108.

Transition commands included in a state change listing 108 may be executed sequentially. In executing a state transition command, a message may be sent to a device 110 that instructs the device 110 to assume a specified state. In one example, the device shadowing service 112 may exchange messages with devices 110 by way of a device gateway as described in relation to FIG. 2. In another example, a communication channel (e.g., a TCP/IP connection) may be established between the device shadowing service 112 and a device 110 that allows for direct communication between the device shadowing service 112 and the device 110.

After sending the message to the device 110, the compute service code or rules engine 104 may wait for a response from the device 110 indicating that the device 110 has assumed the specified state. In one example, the transaction (i.e., the process of updating the state of the device 110 via executing the state transition command) that updates the state of the device 110 may be monitored, such that a failure of the transaction to update to the state of the device 110 may be detected. For example, a timeout period may be used to detect a failure of the device 110 to respond to the message, or the device 110 may send a failure message to the device shadowing service 112 that indicates a failure to update the state of the device 110.

In the event that a failure to update the state of the device 110 is detected, then in one example, unexecuted state transition commands included in the state change listing 108 may be posted to the device representation 106 for the device 110 as the desired state 114 for the device 110, and the next time that the device 110 connects to the device shadowing service 112, the device 110 may be instructed to assume the desired state 114. As an illustration, after successfully executing a first state transition command that updates the state of the device 110 to a first state and detecting a failure of the device 110 to assume a second state as instructed by a second state transition command, the second state (and any additional states specified by unexecuted state transition commands) may be posted to the device representation 106 for the device 110 as one or more desired state 114. Consequently, the next time that the device 110 connects to the device shadowing service 112, the device 110 may be instructed to assume the one or more desired states 114 of the device representation 106.

In another example where a failure to update the state of the device 110 may be detected, the state of the device 110 may be reset to a previous state that existed prior to executing the state change listing 108. As an illustration, after detecting the failure of the device 110 to assume a state as instructed by a state transition command included in a state change listing 108, an initial state of the device 110 that existed prior to executing the state change listing 108 may be posted to the device representation 106 associated with the device 110 as the desired state 114, and the device 110 may be instructed to assume the desired state 114 the next time the device 110 connects to the device shadowing service 112.

In an alternative example, a set of state transition commands may be executed sequentially without waiting for responses from a device 110 that the device 110 has assumed a state indicated by the state transition commands. For example, a set of state transition commands may be executed, sending a set of instructions to a device 110 to sequentially assume a number of states. The device 110 may transition through the states and then send an indication to the device shadowing service 112 that the device 110 has assumed a specified state. As another example, each state transition command in a state change listing 108 may be sequentially executed allowing for an amount of time to pass between the execution of each state transition command.

After successfully executing each of the state transition commands included in the state change listing 108, the recorded state 116 of the device representation 106 associated with the device 110 may be updated to indicate the resulting state of the device 110. As a specific example, after executing a state change listing 108 that instructs a network addressable door to transition from a closed state to an open state using multiple state transition commands that instruct the door to disengage a lock, retract a latch, and engage an actuator that opens the door, the recorded state 116 of a device representation 106 that represents the door may be updated from a "closed" state to an "open" state. After updating the recorded state 114 of the device representation 106 to indicate the resulting state of the device 110, the recorded state 116 may be provided to the application or service 102 that made the state change request.

In another example, the recorded state 116 of the device representation 106 for the device 110 may be updated after the successful execution of individual state transition commands to indicate a state specified by a state transition command. For example, after executing a first state transition command that updates the device 110 to a first state, the recorded state 116 of the device representation 106 associated with the device 110 may be updated to indicate the first state, and updated again after the successful execution of each subsequent state transition command included in the state change listing 108. Using the network addressable door example above, a recorded state of a device representation for the door may be updated to "lock disengaged" after receiving an indication of a first state transition from the door, and updating the recorded state to "latch retracted" after an indication of a second state, and updating the recorded state to "open" after an indication of a third state assumed by the door. The recorded state 116 of the device representation "open" may then be provided to an application or service 102 that made the state change request.

Figure 2:
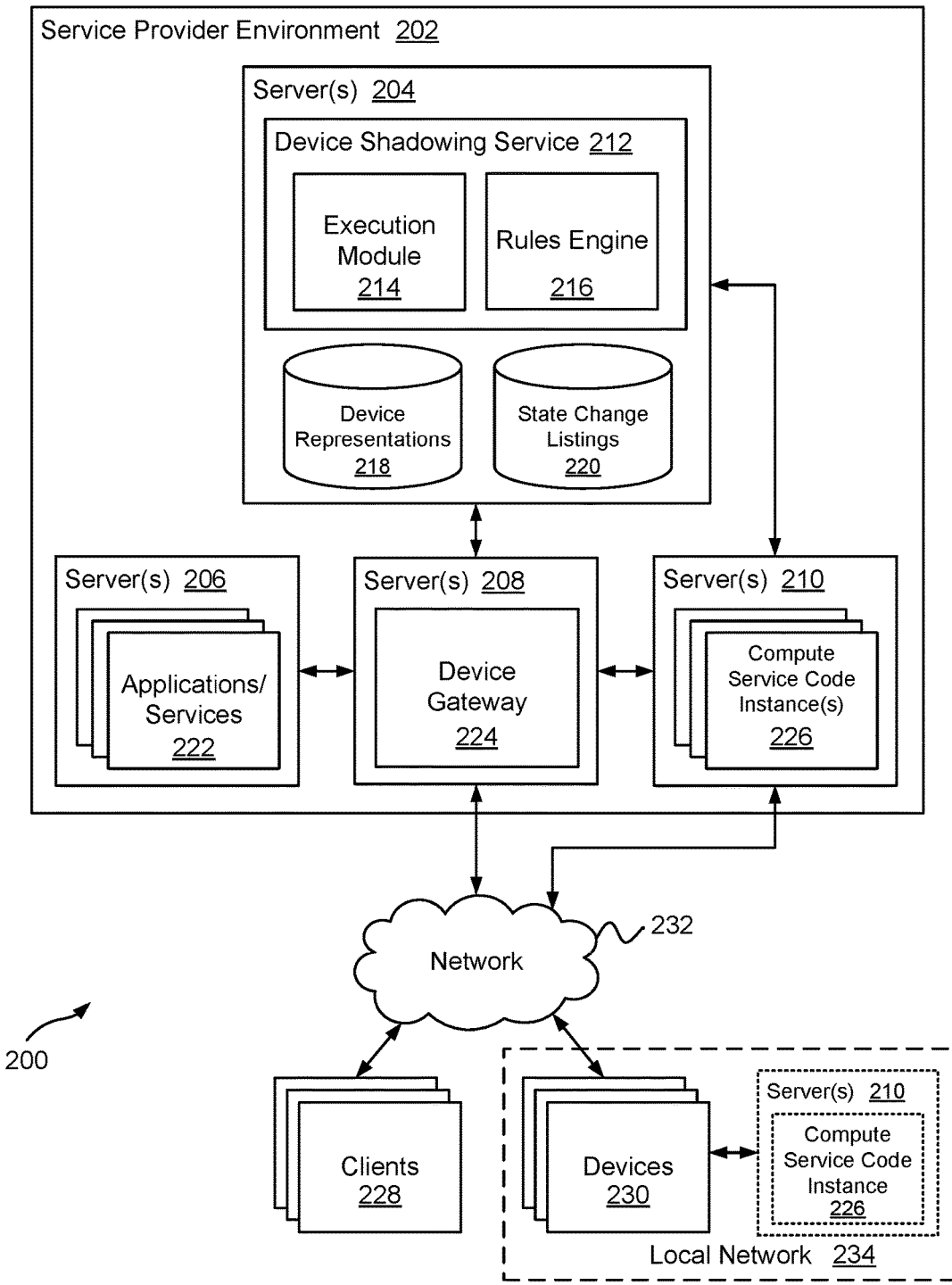
FIG. 2 is a block diagram that illustrates various example components included in a system for operating a device shadowing service that manages multi-step device state transitions.

FIG. 2 illustrates components of an example system 200 on which the present technology may be executed. The system 200 may include a plurality of devices 230 in communication with a service provider environment 202 via one or more networks 232. Illustratively, the devices 230 can include network addressable: global positioning devices, temperature sensors, water sensors, light switches, light bulbs, power outlets, watches, media players, voice command devices, video cameras, security systems, door locks, smoke alarms, thermostats, weather sensors, vehicles, handheld devices, as well as any other device configured to communicate over a network 232.

Figure 4:
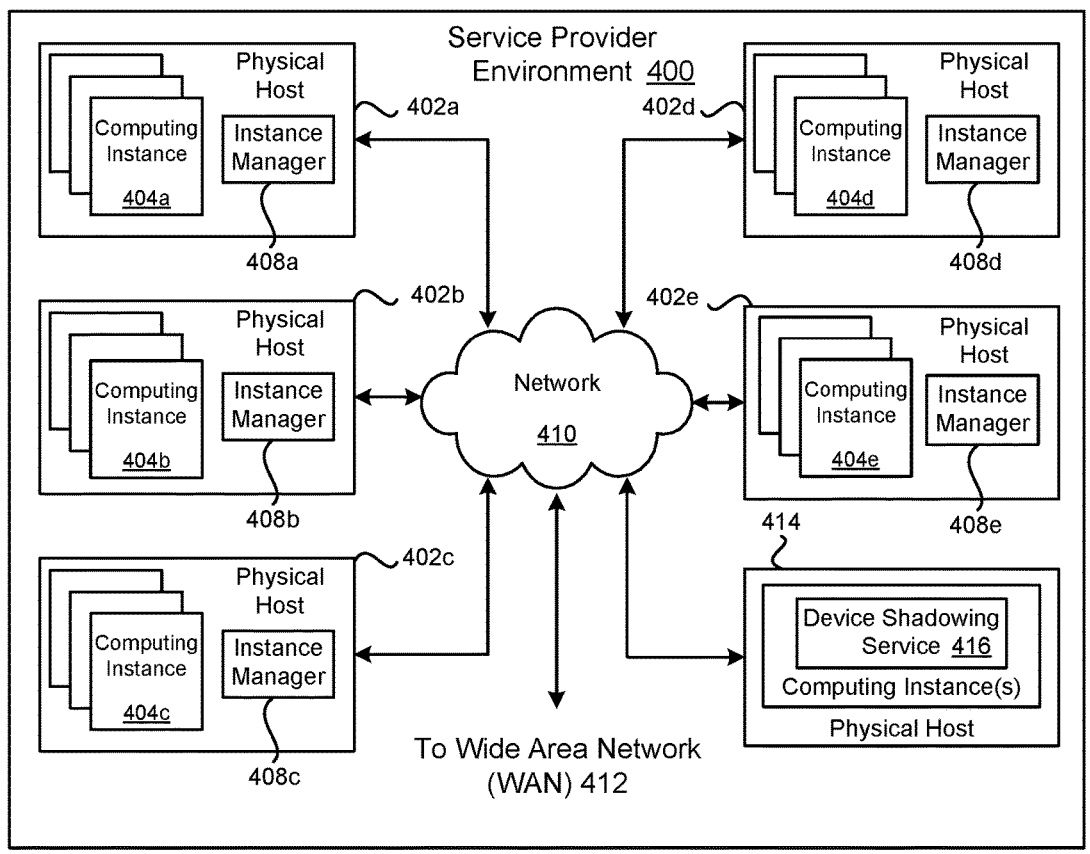
FIG. 4 is a block diagram that illustrates an example service provider environment that includes a device shadowing service.

The service provider environment 202 may include servers 204/206/208/210 for executing computing instances (e.g., virtual machines) as described in relation to FIG. 4. The computing instances may host various services associated with the devices 230. The server 204 may include one or more computing instances that host a device shadowing service 212 configured to manage device representations 218 associated with the devices 230. The device representations 218 may, in one example, include data objects stored using a data-interchange format like JSON (JavaScript Object Notation) or XML (eXtensible Markup Language) in an object data store, NoSQL data store, or a relational data store. The device representations 218 may be made available by the device shadowing service 212 to clients 228, applications and/or services 222 at any time without the need to wake up or otherwise contact an associated device 230.

In one example, the device shadowing service 212 may include an execution module 214 configured to execute state change listings 220 in response to state change requests received from clients 228, applications and/or services 222. The applications and services 222 may execute on servers 206 included in the service provider environment 202, as well as on clients 228 that may be external to the service provider environment 202. In one example, a state change request may include an identifier that can be used by the execution module 214 to retrieve a state change listing 220 associated with the identifier from a data store accessible to the device shadowing service 212. In another example, a client 228, application or service 222 may provide a state change listing in a state change request. For example, a state change listing may be stored on a client 228 and the client 228 may send the state change listing to the device shadowing service 212 along with a request to execute the state change listing. A state change listing 220 may include a set of state transition commands that when executed instruct a device 230 to assume a specified state. In some examples, in addition to a set of state transition commands, a state change listing 220 may include instructions that update a recorded state of a device representation 218 to a state specified by the state change listing 220 upon successful execution of the set of state transition commands.

In receiving a state change request, the execution module 214 may be configured to submit a state change listing 220 to a rules engine 216 for execution of state transition commands included in the state change listing 220 that update the state of a device 230. In one example, the rules engine 216 may be configured to evaluate state transition commands included in a state change listing 220, transform the state transition commands to formatted instructions recognized by a device 230 associated with a state change request, and publish messages intended for the device 230 that include the formatted instructions. For example, the rules engine 216 may convert each state transition command (e.g., written in a SQL syntax variant) included in a state change listing 220 to device recognizable instructions, generate a message for each state transition command that includes the device recognizable instructions, and sequentially publish the messages to an intended device 230 using a command response pattern that publishes a message to the device 230 and awaits an indication that the device 230 has assumed a specified state before publishing a subsequent message.

In some examples, a command identifier may be generated for each state transition command invoked and the command identifier may be included in messages exchanged between the execution module 214 and a device 230. The command identifier may be used by the execution module 214 to track the progress of state transition commands issued to a device 230.

In another example, the execution module 214 may be configured to submit a state change listing 220 to an instance of a compute service code 226. The server 210 may be configured to host computing instances that execute instances of compute service code 226. The server 210 may be included within the service provider environment 202, or alternatively, may be included within a local network 234 that contains one or more devices 230. Illustratively, an instance of a compute service code may include computer code executed in response to an event, (e.g., a state change request event). A compute service may manage computing resources utilized by the computer code using a computing instance hosted in the service provider environment 202 as described in relation to FIG. 4. The use of compute service code 226 may provide advantages associated with parallelism (e.g., executing multiple instances of a state change listing 220 in parallel to update the states of devices included in a group of devices 230), execution efficiency (e.g., distribution of workloads among multiple servers and performing many state change operations while avoiding recording each state change in the device representation), and exception handling (e.g., posting states for unexecuted state transitions to device representations 218), as well as other advantages.

In one example, an instance of the compute service code 226 may be configured to include a set of sequential state transition commands, such that calling the compute service code 226 (e.g., similar to a function call) executes the set of sequential state transition commands. In another example, an instance of the compute service code 226 may be launched and a state change listing 220 may be submitted to the compute service code 226. The instance of compute service code 226 may execute each state transition command included in the set of sequential state transition commands using a command response pattern that publishes a message to the device 230 and awaits an indication that the device 230 has assumed a specified state before publishing a subsequent message. Messages exchanged between the server 210 and the device 230 may be sent through the device gateway 224, or alternatively, messages may be exchanged using a communication channel established between the server 210 and a device 230.

In another example, the execution module 214 may be configured to launch an instance of a compute service code 226 for each individual state transition command included in a state change listing 220. For example, the execution module 214 may be configured to load a state change listing 220 and launch a first instance of a compute service code 226 to execute a first state transition command, launch a second instance of the compute service code 226 to execute a second state transition command, and so on until each state transition command included in the state change listing 220 has been executed.

The execution module 214 may be configured to monitor the execution of state change listings 220 and handle execution errors that may occur in updating the state of the devices 230. As one example, the execution module 214 may be configured to monitor the execution of a state transition command for a time-out operation, where a response from a device 230 indicating that the device 230 assumed a specified state is not received within a specified amount of time. In one example, the execution module 214 may initiate a timer as part of executing a state transition command. In the event that a response is not received from a device 230 prior to the expiration of the timer, an execution error may be assumed resulting in an execution error.

The execution module 214 may be configured to run error handlers. As one example, the execution module 214 may run an error handler that posts unexecuted state transition commands included in the state change listing 220 to a device representation 218 for a device 230, and the next time the device 230 connects to the device shadowing service 212, the device 230 may be instructed to update to the state specified by the state change listing 220. As another example, the execution module 214 may run an error handler that restores a state (e.g., a recorded state) of a device representation to an initial state that existed prior to executing a state change listing 220, and then re-executes the state change listing 220. In some examples, execution errors may be detected by the rules engine 216 or by an instance of the compute service code 226 during execution of a state change listing 220 and the execution errors may be reported to the execution module 214. Alternatively, the rules engine 216 and/or an instance of the compute service code 226 may be configured to handle execution errors that occur during execution of a state change listing 220.

The system 200 may include a device gateway 224 configured to exchange messages using a publication/subscription broker service, which enables one-to-one and one-to-many communications. A one-to-many communication pattern may allow a device 230 to broadcast data to multiple subscribers for a given topic. For example, a system component may publish a message to a named logical channel (e.g., topic) and the message may be distributed to subscribed system components. System components may include, but are not limited to, the device shadowing service 212, clients 228, instances of compute service code 226, applications and services 222. The device gateway 224 may support protocols that include MQTT (Message Queue Telemetry Transport), CoAP (Constrained Application Protocol), HTTP (Hyper Text Transport Protocol), or HTTPS (Hyper Text Transport Protocol Secure) protocols, as well as proprietary or legacy protocols. The device gateway may be configured to scale automatically to support a number of devices 230 (thousands, millions, or even billions of devices 230) using computing resources included in the service provider environment 202.

In one example, clients 228, applications and services 222 may publish messages containing state change requests to named logical channels associated with device representations 218 and the messages may be distributed to the device shadowing service 212, which may be subscribed to receive the messages. A transaction identifier may be created in response to receiving a state change request for a device 230 that updates the state of the device 230 using a state change listing 220. The transaction identifier may be included in communications associated with updating the state of the device 230 to associate the communications with the state change request. In one example, the device shadowing service 212 may be configured to generate a transaction identifier and provide the transaction identifier to a system component associated with the state change request. For example, a transaction identifier may be provided to a client 228 in response to a state change request made by the client 228. Thereafter, communications associated with the state change request between the device shadowing service 212 and the client 228 may include the transaction identifier.

In one example, a temporary named logical channel may be created that includes a transaction identifier associated with a state change request. The named logical channel may be used to push messages associated with the state change request to subscribers of the named logical channel. For example, system components authorized to receive information associated with a device 230 may be provided with a transaction identifier and the system components may subscribe to a temporary named logical channel that includes the transaction identifier as part of the named logical channel's name. As a specific example, a named logical channel that includes a transaction identifier may resemble "$shadow_service/things/thing_name/device_representation/update/transaction_identifier". In the case that a naming convention may be used to create named logical channels, a system component that is provided a transaction identifier may identify and subscribe to a named logical channel using the transaction identifier.

A named logical channel may be terminated after the state of a device 230 has been updated in response to a state change request. For example, after distributing a message indicating that a device 230 has assumed a state specified by a state change listing 220 as requested in a state change request, or after distributing a message indicating that the state change request failed, a named logical channel that includes a transaction identifier for the state change request may be terminated.

The various processes and/or other functionality contained on the system components included in the system 200 may be executed on one or more processors that are in communication with one or more memory modules. The system 200 may include a number of computing devices that are arranged, for example, in one or more server banks or computer banks or other arrangements. The computing devices may support the service provider environment 202 using hypervisors, virtual machine monitors (VMMs) and other virtualization software.

Device representations 218 and state change listing 220 may be stored in one or more data stores. In one example, a key value data store that is external to a device 230 may be used to store a device representation 218. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 202 and may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 232 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
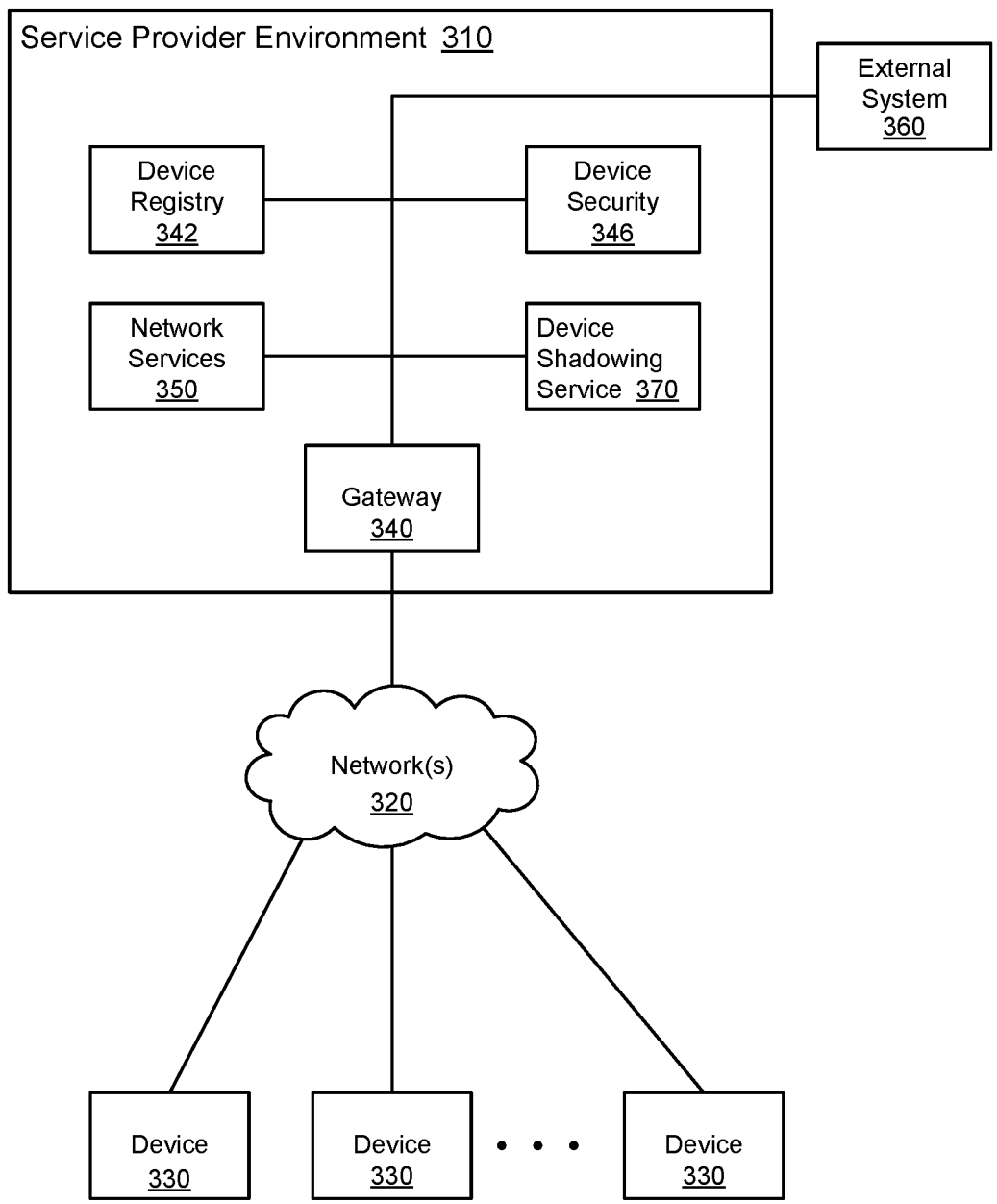
FIG. 3 is a block diagram illustrating an example computer networking architecture for providing devices access to network services.

FIG. 3 is a block diagram illustrating an example service provider environment 310 with which the devices 330 described earlier may communicate. The service provider environment 310, which may be referred to as a device communication environment or system that comprises various resources made accessible via a gateway server 340 to the devices 330 that access the gateway server 340 via a network 320. The devices 330 may access the service provider environment 310 in order to access services such as a device shadowing service 370, data storage, and computing processing features. Services operating in the service provider environment 310 may communicate data and messages to the devices 330 in response to requests from the devices 330 and/or in response to computing operations within the services.

The service provider environment 310 may comprise communicatively coupled component systems 340, 342, 346, 350 and 370 that operate to provide services to the devices 330. The gateway server 340 may be configured to provide an interface between the devices 330 and the service provider environment 310. The gateway server 340 receives requests from the devices 330 and forwards corresponding data and messages to the appropriate systems within the service provider environment 310. Likewise, when systems within the service provider environment 310 attempt to communicate data instructions to the devices 330, the gateway server 340 routes those requests to the correct device 330.

The gateway server 340 may be adapted to communicate with varied devices 330 using various different computing and communication capabilities. For example, the gateway server 340 may be adapted to communicate using either TCP (Transmission Control Protocol) or UDP (User Datagram Protocol) protocols. Likewise, the gateway server 340 may be programmed to receive and communicate with the devices 330 using any suitable protocol including, for example, MQTT, CoAP, HTTP, and HTTPS. The gateway server 340 may be programmed to convert the data and instructions or messages received from the devices 330 into a format that may be used by other server systems comprised in the service provider environment 310. In one example, the gateway server 340 may be adapted to convert a message received using the HTTPS protocol into a JSON formatted message that is suitable for communication to other servers within the service provider environment 310.

The gateway server 340 may store, or may control the storing, of information regarding the devices 330 that have formed a connection to the particular gateway server 340 and for which the particular gateway server 340 may be generally relied upon for communications with the device 330. In one example, the gateway server 340 may have stored thereon information specifying the particular device 330 such as a device identifier. For each connection established from the particular device 330, the gateway server 340 may also maintain information identifying the connection. For example, a connection identifier may be generated and stored for each connection established with a particular device 330. Information relating to the particular connection may also be stored. For example, information identifying the particular socket of the gateway server 340 on which the connection was established, as well as information identifying the particular protocol used by the device 330 on the connection may be stored by the gateway server 340. Information such as the socket and protocol may be used in order to facilitate further communications via the particular connection.

In one example, the gateway server 340 may communicate via any suitable networking technology with a device registry server 342. The device registry server 342 may be adapted to track the attributes and capabilities of each device 330. In an example, the device registry sever 342 may be provisioned with information specifying the attributes of the devices 330. The device registry server 342 may comprise data specifying rules or logic (e.g., automation rules) for handling various requests that may be received from the devices 330. The device registry server 342 may be programmed to convert specialized device functions or commands received in particular communication protocols such as, for example HTTPS, MQTT, CoAP, into functions or commands using particular protocols that are understood by other of the servers in the service provider environment 310. In one example, the device registry server 342 may be provisioned with information specifying that upon receipt of a particular request from a particular device 330, a request should be made to store the payload data of the request in a particular network service server 350. The device registry server 342 may be similarly programmed to receive requests from servers 342, 350 and convert those requests into commands and protocols understood by the devices 330.

The device shadowing service server 370 maintains state information for each connected device 330. In an example embodiment, the device shadowing service server 370 maintains for each device 330 that has connected to the environment 310 information specifying a plurality of states. In an example scenario, the device shadowing service server 370 may comprise a recorded state and a desired state. The recorded state represents the existing state of the particular device 330 as presently known to the device shadowing service server 370. The device shadowing service server 370 may be configured to manage multi-step device state transitions as described earlier. The device shadowing service server 370 communicates with the device gateway 340 in order to communicate requests to update a status to a particular device 330. For example, the device shadowing sever 370 may communicate to the device gateway 340 a sequence of state transition commands that update the status of a device 330. The device gateway 340 may, in response, communicate the appropriate commands formatted for the particular device.

The device security server 346 maintains security-related information for the devices 330 that connect to the service provider environment 310. In one example, the device security server 346 may be programmed to process requests to register devices with the service provider environment 310. For example, entities such as device manufacturers, may forward requests to register devices 330 with the service provider environment 310. The device security server 346 receives registration requests and assigns unique device identifiers to devices 330 which use the device identifiers on subsequent requests to access the service provider environment 310. The device security server 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the service provider environment 310, the request may be routed to the device security server 346 for evaluation. The device security server 346 determines whether authentication information provided in the request is consistent with the authentication information stored in relation to the device identifier and provided during the registration process.

The device security server 346 may be further programmed to process request to associate particular entities (individuals or organizations) with particular devices 330. The device security server 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web services server which may be comprised in service provider environment 310 or which communicates the request to the service provider environment 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security server 346 stores the information identifying the particular entity in relation with the device identifier. When the particular entity subsequently attempts to control or communicate data to the particular device 330, the device security server 346 may use the information to confirm that the particular entity is authorized to communicate with or control the particular device 330. When an entity that has not been registered as being authorized to communicate with the device 330 attempts to communicate with or control the device 330, the device security server 346 may use the information stored in the device security server 346 to deny the request.

A network services server 350 may be any resource or processing server that may be used by any of servers 340, 342, 346, or 370 in processing requests from the devices 330. In one example, network services server 350 may provide data storage and retrieval services and/or on-demand processing capacity. In an example scenario, the network services server 350 may be any of numerous network accessible services including, for example, web or cloud-based services. In one example, the web services server 350 may be programmed to provide particular processing for particular devices 330 and/or groups of devices 330. For example, a network services server 350 may be provisioned with software that coordinates the operation of a particular set of devices 330 that control a particular manufacturing operation.

Servers 340, 342, 346, 350, and 370 may be communicatively coupled via any suitable networking hardware and software. For example, the servers may communicate via a local area network or wide area network.

An external system 360 may access service provider environment 310 for any number of purposes. In one example, an external system 360 may be a system adapted to forward requests to register devices 330 with the service provider environment 310. For example, an external system 360 may include a server operated by or for a device manufacturer that sends requests to service provider environment 310, and device security server 346 in particular, to register devices 330 for operation with service provider environment 310. Similarly, the external system 360 may be a system operated to provide a gateway for entities (individuals or organizations) to register an ownership or control relationship with a particular device 330.

The devices 330 may be any devices that may be communicatively coupled via a network 320 with the service provider environment 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services server 350. While FIG. 3 depicts three devices 330, it will be appreciated that any number of devices 330 may access the service provider environment 310 via the gateway server 340. Further it will be appreciated that the devices 330 may employ various different communication protocols. For example, some devices 330 may transport data using TCP, while others may communicate data using UDP. Some devices 330 may use MQTT, while others may use CoAP, and still others may use HTTPs. It will also be appreciated that each of devices 330 may be programmed to send and receive particular functions or commands in its requests that are not compatible with other devices or even the systems within service provider environment 310. The gateway server 340 may be programmed to receive and, if needed, attend to converting such requests for processing with the service provider environment 310.

FIG. 4 is a block diagram illustrating an example service provider environment 400 that may be used to execute and manage a number of computing instances 404a-e. In particular, the service provider environment 400 depicted illustrates one environment in which the technology described herein may be used. The service provider environment 400 may be one type of environment that includes various virtualized service resources that may be used, for instance, to host computing instances 404a-e.

The service provider environment 400 may be capable of delivery of computing, storage and networking capacity as a software service to a community of end recipients. In one example, the service provider environment 400 may be established for an organization by or on behalf of the organization. That is, the service provider environment 400 may offer a "private cloud environment." In another example, the service provider environment 400 may support a multi-tenant environment, wherein a plurality of customers may operate independently (i.e., a public cloud environment). Generally speaking, the service provider environment 400 may provide the following models: Infrastructure as a Service ("IaaS"), Platform as a Service ("PaaS"), and/or Software as a Service ("SaaS"). Other models may be provided. For the IaaS model, the service provider environment 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on a computing service platform provided by the service provider environment 400 without incurring the cost of buying and managing the underlying hardware and software. The SaaS model allows installation and operation of application software in the service provider environment 400. End customers may access the service provider environment 400 using networked client devices, such as desktop computers, laptops, tablets, smartphones, etc. running web browsers or other lightweight client applications, for example. Those familiar with the art will recognize that the service provider environment 400 may be described as a "cloud" environment.

The particularly illustrated service provider environment 400 may include a plurality of physical hosts 402a-e. While six physical hosts are shown, any number may be used, and large data centers may include thousands of physical hosts. The service provider environment 400 may provide computing resources for executing computing instances 404a-e. Computing instances 404a-e may, for example, be virtual machines. A virtual machine may be an instance of a software implementation of a machine (i.e. a computer) that executes applications like a physical machine. In the example of a virtual machine, each of the physical hosts 402a-e may be configured to execute an instance manager 408a-e capable of executing the instances. The instance manager 408a-e may be a hypervisor, virtual machine monitor (VMM), or another type of program configured to enable the execution of multiple computing instances 404a-e on a single server. Additionally, each of the computing instances 404a-e may be configured to execute one or more applications.

A server 414 may execute a device shadowing service 416 configured to execute the functions described earlier. In one example, the device shadowing service 416 may be hosted by one or more computing instances 404a-e. In some examples, one or more computing instances 404a-e may be configured to host instances of compute service code that may be called to update the state of a device that interfaces with the device shadowing service 416.

A network 410 may be utilized to interconnect the service provider environment 400 and the physical hosts 402a-e, 414. The network 410 may be a local area network (LAN) and may be connected to a Wide Area Network (WAN) 412 or the Internet, so that end customers may access the service provider environment 400. The network topology illustrated in FIG. 4 has been simplified, many more networks and networking devices may be utilized to interconnect the various computing systems disclosed herein.

Figure 5:
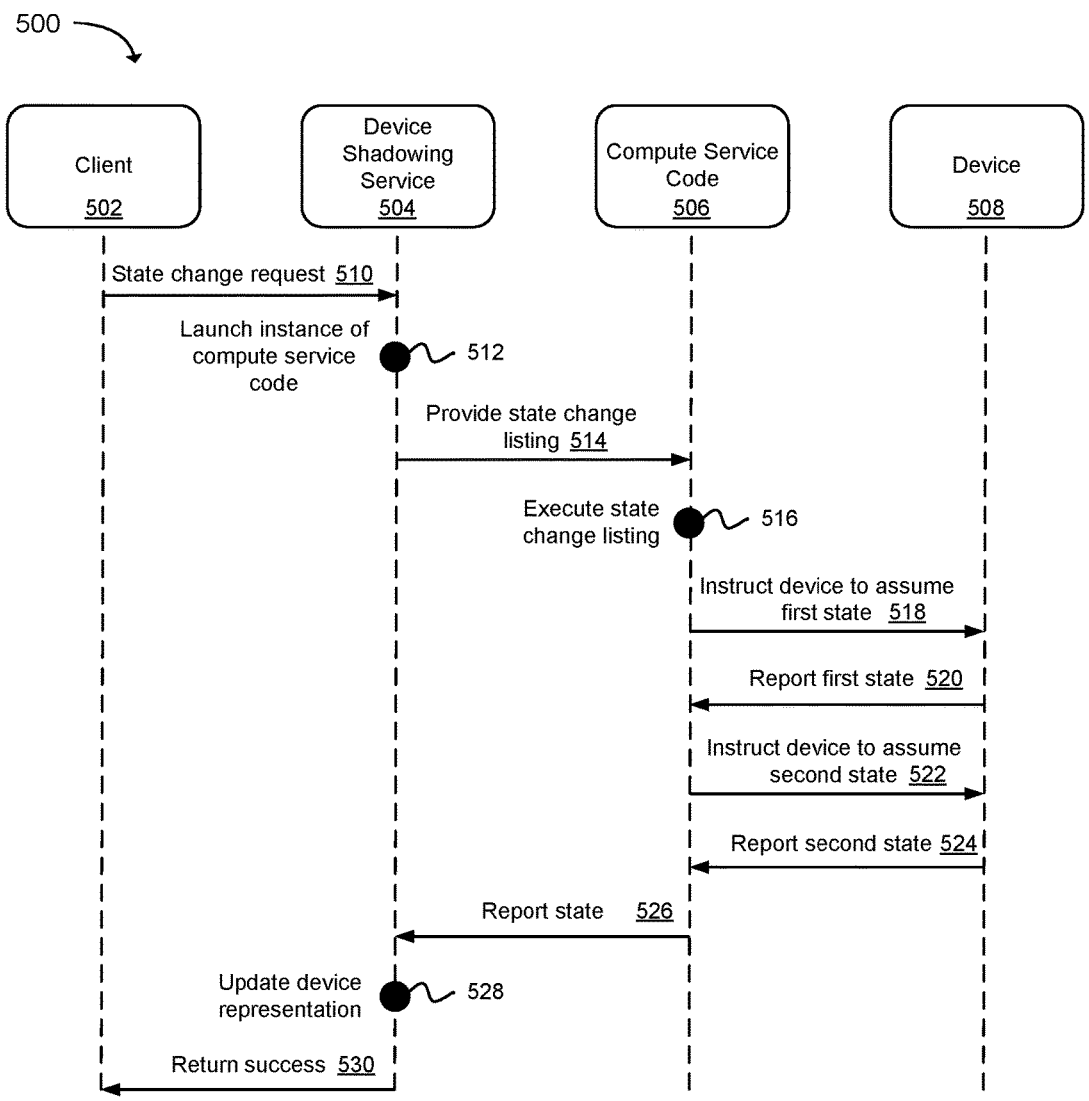
FIG. 5 is a sequence diagram illustrating an example method for updating a state of a device using a state change listing executed by an instance of a compute service code.

FIG. 5 is a sequence diagram illustrating an example method 500 for updating a state of a device 508 using a state change listing executed by an instance of a compute service code 506. As illustrated, a client 502 may send a state change request 510 to a device shadowing service 504. The state change request may include a request to execute a state change listing that includes a set of state transition commands. Each state transition command in the set of transition commands may instruct a device 508 to assume a specified state. The state transition commands may be executed sequentially using a command response pattern that instructs a device 508 to assume a first state and awaits an indication from the device 508 that the device 508 has assumed the first state before instructing the device 508 to assume a second state.

As an illustration, a state change listing may include a set of state transition commands that instruct a device 508 to incrementally transition from an initial state to an end state, such as transitioning from an "open" state to a "closed" state, or from an "on" state to an "off" state by assuming a series of intermediate states. As another illustration, a state change listing may include a set of state transition commands that instruct a device 508 to perform a function by transitioning between a number of states that starts and ends with an initial state, such as transitioning from a "closed" state to an "open" state and back to the "closed state".

In response to receiving the state change request, the device shadowing service 504 may launch an instance of compute service code 512 that executes the state change listing. The state change listing may be provided in the state change request and the state change listing may be submitted to the compute service code 514, or the compute service code may be preconfigured with the state change listing. The compute service code 506 may execute the state transition commands 516 included in the state change listing. For example, a first state transition command may be executed that sends an instruction to the device 508 to assume a first state 518. The device 508 may receive the instructions and assume the first state as instructed. The device may then report back to the compute service code 506 that the device 508 has assumed the first state 520.

In receiving an indication that the device 508 has assumed the first state, the compute service code 506 may execute a second state transition command that instructs the device 508 to assume a second state 522. The device 508 may receive the instructions and assume the second state, whereupon the device 508 may report back to the compute service code 506 that the device 508 has assumed the second state 524. As will be appreciated, the state change listing may include additional state transition commands that may be executed by the compute service code 506.

At the conclusion of executing the set of state transition commands included in the state change listing, the compute service code 506 may report 526 the state assumed by the device 508 to the device shadowing service 504. The device shadowing service 504 may update a recorded state of a device representation 528 that represents the device 508 to indicate the state reported by the compute service code 506. The device shadowing service 504 may then return an indication to the client 502 that the state change request was successful 530.

Figure 6:
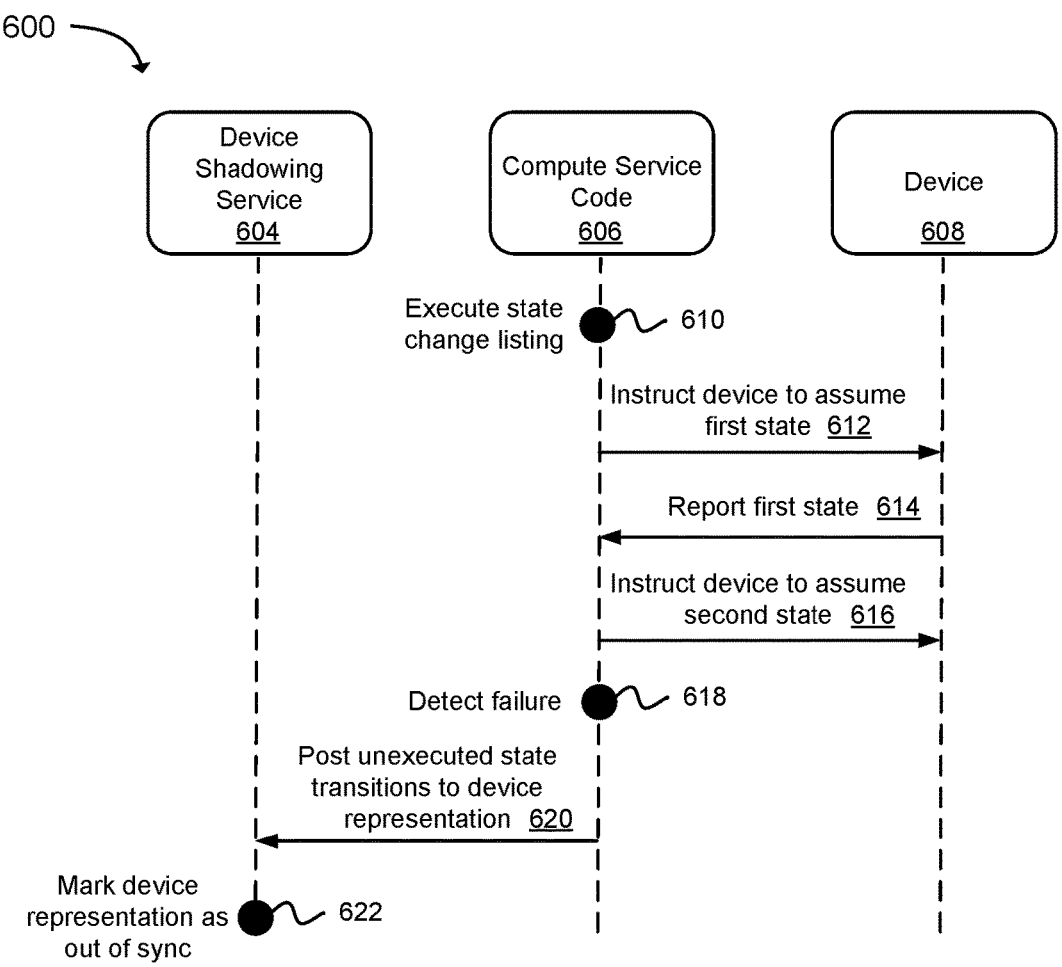
FIG. 6 is a sequence diagram illustrating an example method for handing a failure to fully execute a set of state transition commands included in a state change listing.

FIG. 6 is a sequence diagram illustrating an example method 600 for handing a failure to fully execute a set of state transition commands included in a state change listing in response to a state change request for a device 608 made to a device shadowing service 604. Because a state change listing may include multiple state change commands, a failure associated with executing a particular state change command may occur at any point during the course of executing the set of state change commands, potentially placing the device 608 in an unrealized state. In the event that a first state transition command included in a set of state transition commands fails (e.g., because the device 608 is unreachable), no action may be needed since the state of the device 608 is unchanged. However, in the case that at least one state transition command has been successfully executed and a subsequent state transition command fails, a mitigation action may need to be performed to bring the state of the device 608 in line with the expected state that would have been realized had the set of state transition commands been fully executed.

The method 600 provides one example of a mitigation action that may be performed in the event that during the course of executing a state change listing where a first state transition command has been executed, a second state transition command fails. For example, an instance of a compute service code 606 may receive or execute a state change listing 610 as described earlier, such that the device 608 may be instructed to assume a first state 612 and the device 608 may report back that the device has assumed the first state 614. The device may be instructed to assume a second state 616, whereupon a failure may be detected 618. For example, the device 608 may fail to respond within a specified amount of time, or the device 608 may respond with an indication that the device 608 was unable to assume the second state.

In detecting the failure, the compute service code 606 may update a device representation managed by the device shadowing service 604 that represents the device 608 to indicate an error and post 620 any unexecuted state transitions to the device representation. For example, unrealized states may be posted to the device representation as desired states. The device representation may then be marked as being out of sync 622 with the actual state of the device 608. The next time the device 608 connects to the device shadowing service 604, the device 608 may be instructed to assume the desired states. In another example, an initial state of the device 608 (i.e., the state of the device that existed prior to executing the state change listing) may be posted to the device representation as the desired state, such that the next time the device 608 connects to the device shadowing service 604, the device 608 may be instructed to assume the initial state, resetting the state of the device 608 to the initial state.

Figure 7:
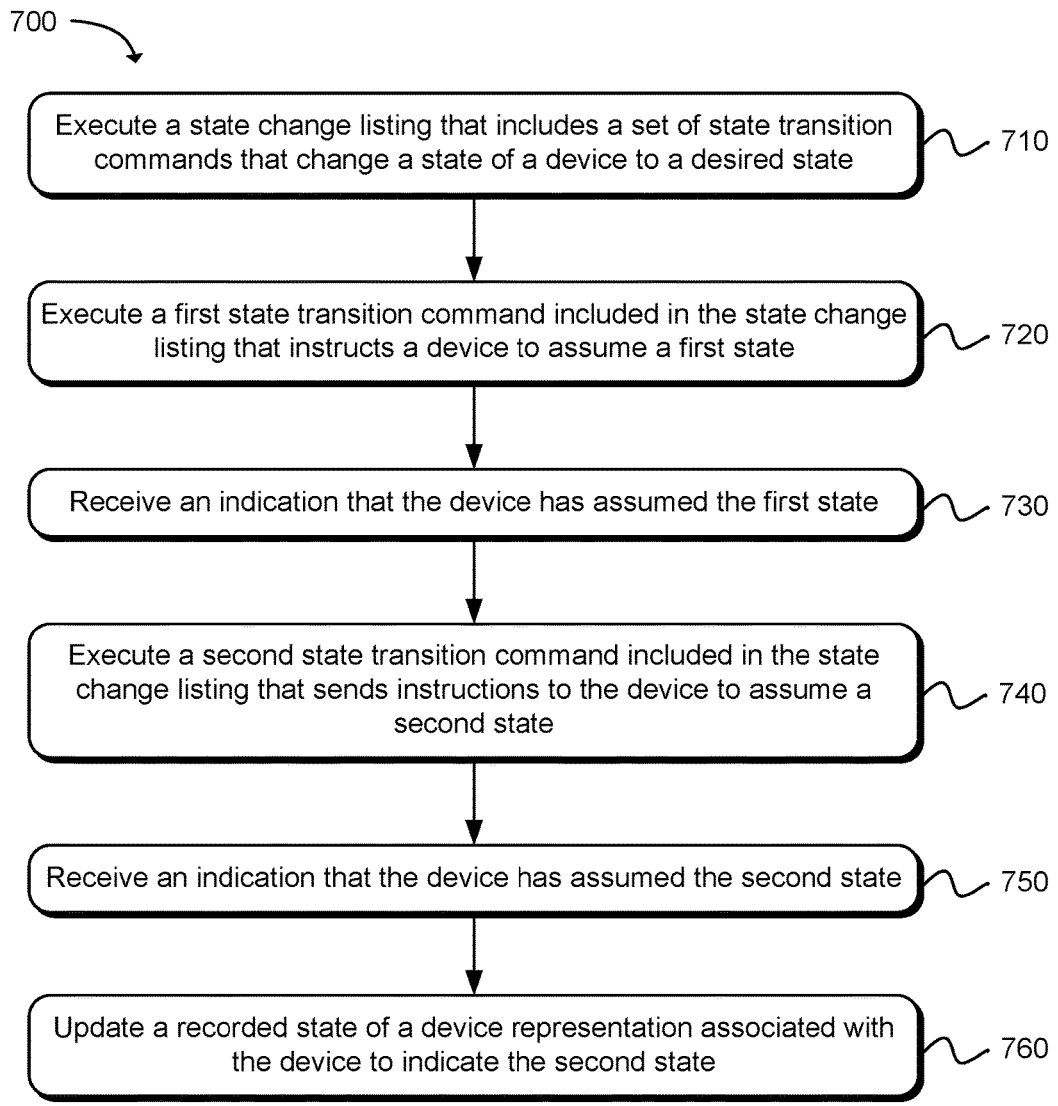
FIG. 7 is a flow diagram that illustrates an example method for operating a device shadowing service that manages multi-step device state transitions.

FIG. 7 is a flow diagram that illustrates an example method 700 for operating a device shadowing service that manages multi-step device state transitions. As in block 710, a state change listing that includes a set of state transition commands that change a state of a device to a desired state may be executed. The device may be addressable by a device shadowing service over one or more computer networks and the device shadowing service may be configured to manage states of the device using a device representation that represents the device.

As in block 720, a first state transition command included in the state change listing may be executed. The first state transition command may instruct the device to assume a first state. As in block 730, an indication that the device has assumed the first state may be received. As a result of receiving the indication that the device has assumed the first state, as in block 740, a second state transition command included in the state change listing may be executed, such that instructions may be sent to the device instructing the device to assume a second state.

The second state transition command may be the last state transition command included in the set of state transition commands. In as much, as in block 750, an indication that the device has assumed the second state may be received, and in response, as in block 760, a recorded state of a device representation associated with the device may be updated to indicate the second state.

Figure 8:
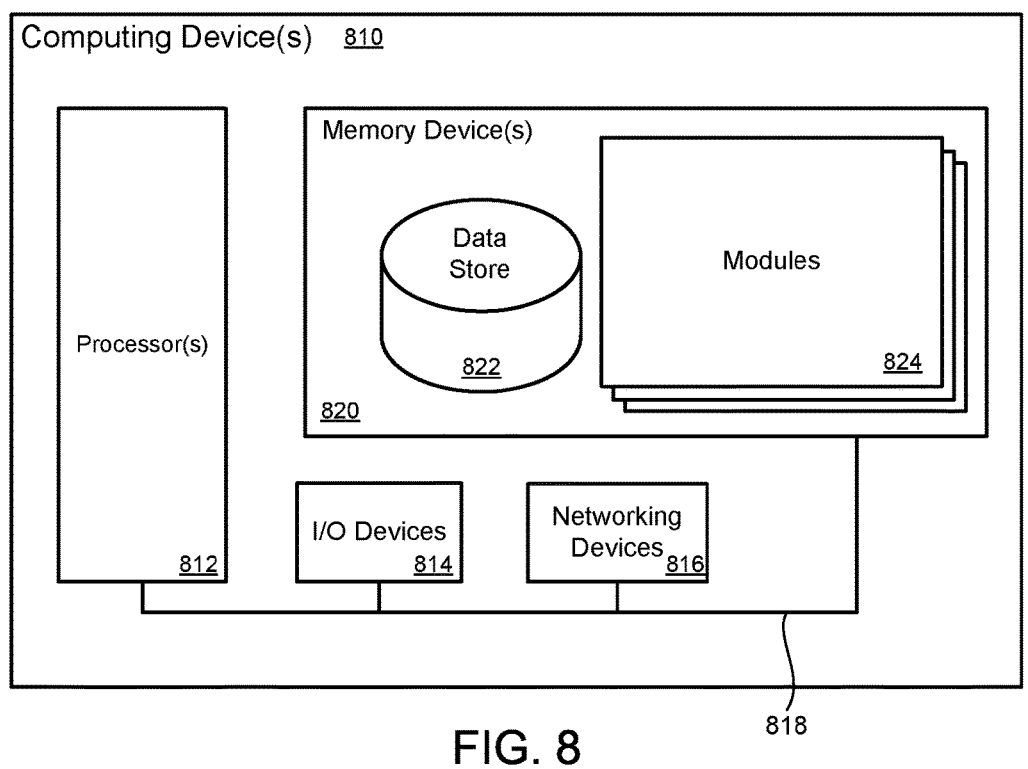
FIG. 8 is block diagram illustrating an example of a computing device that may be used to execute a method for updating a state of device using a set of state transition commands.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for operating a device shadowing service that enables multi-step device state transitions comprising:
    at least one processor;
    a memory device including instructions that, when executed by the at least one processor, cause the system to:
    receive a state change request associated with a device to update a state of the device to a desired state using a state change listing that includes a set of sequential state transition commands, wherein the device is a physical computing device which connects to the device shadowing service over one or more networks;
    launch an instance of a compute service code to execute the state change listing;
    execute a first state transition command included in the state change listing that sends instructions to the device to have the device assume a first state;
    receive an indication that the device has assumed the first state;
    execute a second state transition command included in the state change listing that sends instructions to the device to have the device assume a second state;
    receive an indication that the device has assumed the second state that corresponds to the desired state;
    update a recorded state of a device representation associated with the device to indicate the desired state, wherein the device representation represents the device and the device shadowing service maintains the device representation; and
    return an indication of the recorded state of the device representation.

2. A system as in claim 1, wherein the memory device includes instructions that, when executed by the at least one processor, causes the system to further determine that the device is available to receive the update to the state of the device.

3. A system as in claim 1, wherein the instance of the compute service code executes each state transition command included in the set of sequential state transition commands.

4. A system as in claim 1, wherein the memory device includes instructions that, when executed by the at least one processor, causes the system to further launch an additional instance of compute service code to execute a state transition command included in the set of sequential state transition commands.

5. A computer implemented method, comprising:
receiving a state change listing that includes a set of state transition commands that include instructions for a device to change a state of the device to a desired state, wherein the device is a physical computing device which is addressable by a device shadowing service configured to manage states of the device using a device representation that represents the device over one or more computer networks;
executing a first state transition command included in the state change listing that instructs the device to assume a first state;
receiving an indication that the device has assumed the first state;
executing a second state transition command included in the state change listing that sends instructions to the device to assume a second state;
receiving an indication that the device has assumed the second state; and
updating a recorded state of the device representation associated with the device to indicate the second state, wherein the device representation represents the device and the device shadowing service maintains the device representation.

6. A method as in claim 5, further comprising receiving a state change request from a client requesting that the state of the device be updated to the desired state using the state change listing provided by the client.

7. A method as in claim 5, further comprising retrieving the state change listing from data storage that is accessible to the device shadowing service in response to receiving a state change request from a client.

8. A method as in claim 5, further comprising creating a transaction identifier in response to receiving a state change request from a client requesting that the state of the device be updated to the desired state, wherein the transaction identifier is used in communications associated with updating the state of the device.

9. A method as in claim 8, further comprising providing the transaction identifier to the client associated with the state change request.

10. A method as in claim 5, further comprising creating a named logical channel that includes a transaction identifier associated with a state change request, wherein the named logical channel is used to push messages associated with the state change request to subscribers of the named logical channel.

11. A method as in claim 10, further comprising subscribing to the named logical channel that includes the transaction identifier associated with the state change request to receive messages published by the device that indicate that the device has assumed a particular state.

12. A method as in claim 10, further comprising terminating the named logical channel after returning the recorded state of the device representation to a client associated with the state change request.

13. A method as in claim 5, wherein receiving the indication that the device has assumed the first state further comprises updating the recorded state of the device representation associated with the device to indicate the first state.

14. A method as in claim 5, wherein the device shadowing service is hosted in a service provider environment that is accessible to clients configured to interact with the device shadowing service.

15. A method as in claim 5, wherein the device shadowing service is configured to monitor a transaction, which updates the state of the device using the state change listing, for a failure to update to the state of the device and post unexecuted state transition commands to the device representation as the desired state.

16. A method as in claim 5, wherein executing the state change listing further comprises submitting the state change listing to a rules engine for processing of the set of state transition commands included in the state change listing.

17. A method as in claim 5, wherein executing the state change listing further comprises submitting the set of state transition commands included in the state change listing to an instance of compute service code that processes the set of state transition commands, wherein a compute service manages computing resources used by the compute service code to process the set of state transition commands.

18. A non-transitory machine readable storage medium having instructions embodied thereon, the instructions when executed by at least one processor:
receive a first message published to a first named logical channel requesting that a state of a device be updated to a desired state using a state change listing that includes a set of state transition commands, wherein the device is a physical computing device which connects to a device shadowing service over one or more networks, and wherein the named logical channel is managed by a publication/subscription broker service configured to send messages to clients registered to receive the messages for the named logical channel;
execute a first state transition command included in the set of state transition commands that sends instructions to the device to have the device assume a first state;
receive an indication that the device has assumed the first transitional state;
execute a second state transition command included in the set of state transition commands that sends instructions to the device to have the device assume a second state;
receive an indication that the device has assumed the second state that corresponds to the desired state;
update a recorded state of a device representation associated with the device to indicate the second state, wherein the device representation represents the device and the device shadowing service maintains the device representation; and
publish a second message to a second named logical channel indicating the recorded state of the device representation.

19. A non-transitory machine readable storage medium as in claim 18, wherein the instructions that when executed by the at least one processor further determine that an initial state of the device is different from the desired state, thereby allowing a state change request to be executed.

20. A non-transitory machine readable storage medium as in claim 18, wherein communication with the device is accomplished using named logical channels that are linked to an action.

* * * * *